United States Patent [19]

Kobayashi

[11] 4,221,033

[45] Sep. 9, 1980

[54] METHOD OF MAKING A TUBULAR CAPACITOR

[75] Inventor: Tomiji Kobayashi, Gunma, Japan

[73] Assignee: Taiyo Yuden Co., Ltd., Tokyo, Japan

[21] Appl. No.: 957,071

[22] Filed: Nov. 2, 1978

[30] Foreign Application Priority Data

Nov. 19, 1977 [JP] Japan .................................. 52-139061
Aug. 25, 1978 [JP] Japan .................................. 53-103600

[51] Int. Cl.³ .......................................... H01G 4/28
[52] U.S. Cl. .................................. 29/25.42; 29/855; 361/310
[58] Field of Search ................. 29/25.42, 628, 619, 29/621; 361/310, 306, 321; 338/332, 329

[56] References Cited

U.S. PATENT DOCUMENTS

| | | | |
|---|---|---|---|
| 3,233,028 | 1/1966 | Toppari et al. | 29/25.42 X |
| 3,416,207 | 12/1968 | Maida | 29/25.42 |

*Primary Examiner*—Carl E. Hall

*Attorney, Agent, or Firm*—Woodcock, Washburn, Kurtz, Mackiewicz & Norris

[57] ABSTRACT

A tube of ceramic dielectric material having inner and outer electrodes formed thereon is immersed in an alcohol solution of rosin to form a rosin film over the entire exposed surfaces thereof. A pair of metal caps, each having a plurality of circumferentially spaced inward projections and a thin solder layer covering at least each inward projection, are then pressed onto the opposite ends of the ceramic tube, thereby embedding the inward projections of each metal cap in one of the electrodes. The solder layer on each metal cap projection is then melted to establish firm mechanical and electrical contact between electrodes and metal caps. Semiflexible, hermetic sealing joints are then formed at least between electrodes and metal caps by applying an insulating paint while the ceramic tube and metal caps are being heated to partly evacuate the interior thereof. Finally, an external covering comprising one or more insulating layers is formed at least over the sealing joints and a region therebetween.

16 Claims, 16 Drawing Figures

METHOD OF MAKING A TUBULAR CAPACITOR

BACKGROUND OF THE INVENTION

1. Field of the Invention

My invention concerns a method of manufacturing a tubular type of capacitor and, in particular, such a capacitor having at least two electrodes formed on a tube of dielectric material, usually a ceramic, and held in mechanical and electrical contact with a pair of metal caps pressed onto the opposite ends of the dielectric tube.

2. Description of the Prior Art

In the manufacture of a tubular ceramic capacitor, the tube of dielectric material forming the insulation between the electrodes is usually fabricated by extruding into tubular form a mixture of a ceramic material composed principally of barium titanate ($BaTiO_3$), strontium titanate ($SiTiO_3$) or the like, and a binder. Cut into desired lengths, the tubular extrusion is then sintered or heated into coherent bonded bodies.

On this sintering operation the ceramic tubes are contracted to variable degrees, up to approximately 20% of the original size. In view of such inevitable dimensional errors of the ceramic tubes, a pair of metal caps pressed onto the opposite ends of each ceramic tube, following the formation of electrodes thereon, are preferably each slitted to provide a plurality of spring fingers, as disclosed for example in J. E. Toppari et al. U.S. Pat. No. 3,233,028. The use of such slitted metal caps, however, is insufficient to ensure their firm mechanical and electrical contact with the electrodes on the ceramic tube. J. E. Toppari et al. suggest, therefore, a plastic insulating base molded around and completely enclosing the capacitor. This measure is still unsatisfactory.

Another important consideration required in the manufacture of tubular ceramic capacitors is the maintenance of their desired electrical properties for as long a period of time as possible. This requirement can be attained in part by isolating the interior of the ceramic tube from the atmosphere. J. E. Toppari et al. teach to fill the bore of the dielectric tube with a thixotropic gelable silicone dielectric liquid and to gel the liquid in situ.

It may be contemplated, as an alternative, to form joints of solder or conductive paint between metal caps and electrodes on the ceramic tube, for the attainment of the dual objective of mechanically and electrically connecting the metal caps and electrodes and hermetically sealing the interior of the ceramic tube. This measure is objectionable because the solder or conductive paint is likely to flow into the interior of the capacitor thereby short-circuiting the electrodes. As an additional disadvantage, the joints of solder or conductive paint are incapable of withstanding all operating temperatures.

SUMMARY OF THE INVENTION

It is an object of my invention to provide an improved method of manufacturing a tubular type of capacitor, such that firm mechanical and electrical contact can be established between electrodes and metal caps regardless of possible variations in the size of the dielectric tube.

Another object of my invention is to provide a method of manufacturing a tubular capacitor which is effectively sealed hermetrically without the least possibility of the electrodes being short-circuited.

Another object of my invention is to provide a method of the character described which is well calculated to permit automatic manufacture of tubular capacitors.

According to the method of my invention, stated in brief, there is first provided a tube of dielectric material having at least two electrodes formed thereon, with the electrodes overlying at least the outer surfaces of the opposite end portions of the dielectric tube. A rosin film is then formed over the exposed surfaces of the dielectric tube and the electrodes thereon, as by immersing them in an alcohol solution of rosin with little or no chlorine content. Each having a plurality of inward projections formed at circumferential spacings thereon and a solder layer covering at least each inward projection, a pair of metal caps are then pressed onto the opposite ends of the dielectric tube, so that the inward projections of each metal cap are engaged with or embedded in one of the electrodes on the dielectric tube for mechanical and electrical contact therewith. The solder layer on each inward projection of each metal cap is then melted to reinforce or establish the firm mechanical and electrical contact between electrodes and metal caps through soldered joints formed between electrodes and metal cap projections. Substantially flexible, hermetic sealing joints are then formed at least between electrodes and metal caps by applying an electrically insulating paint while the interior of the dielectric tube and metal caps is substantially evacuated. Finally, an external covering comprising one or more layers of insulating material is formed at least over the sealing joints and a region therebetween.

Preferably, the rosin film is formed by immersing the dielectric tube together with the electrodes thereon in an approximately 10–40% by weight alcohol solution of rosin, with a chlorine content of 0–0.03% by weight. This rosin film serves the multiple purpose of facilitating the soldering of the metal cap projections onto the electrodes, protecting the electrodes against oxidation, moistureproofing the capacitor, and ensuring insulation between the electrodes. Instead of alcohol, solvents such as ethyl ether, benzene and acetone may be employed, with or without an activator or like agents.

According to a preferred construction of the metal caps used in the method of my invention, each cap is slitted to provide a plurality of gripping fingers, with each inward projection formed on one of the gripping fingers by indenting the cap from without. Hemispherical or frustoconical in shape, all or some of the inward projections of each metal cap become embedded in one of the electrodes when the cap is pressed in place.

The solder layer may be formed by plating over the complate surfaces of each metal cap, for the ease of manufacture. When melted, the solder layer establishes or reinforces the mechanical and electrical contact between all the inward projections of each metal cap and one of the electrodes. The solder plating is so thin that there is no fear of the electrodes being short-circuited by the molten solder.

The sealing joints are preferably formed by coating an insulating paint comprising epoxy resin of the bisphenol A type, filler, and hardener, in such proportions that the sealing joints have a Shore hardness rating of 50–80. Such semiflexible sealing joints are little affected by temperatures, besides being excellent in adhesiveness, moistureproofing ability, and electrical resistivity.

In applying the insulating paint, the dielectric tube together with the electrodes thereon is preferably heated to a temperature higher than the maximum temperature of subsequent heat treatments thereby partly evacuating the interior thereof. This serves to prevent the sealing joints from being ruptured by expansion of the confined air when the dielectric tube is heated in the subsequent steps of manufacture.

The external covering of the capacitor may comprise either a phenol resin layer and an epoxy resin layer, with the latter overlying the former, or a single layer of epoxy resin, depending at least in part upon the make of the underlying sealing joints. Either way, the external covering can be minimized in thickness because the covering is not expected to help maintain the rigid connection between electrodes and metal caps. This objective is amply accomplished by the metal caps themselves which have their inward projections positively engaged with or embedded in the electrodes and further soldered thereto.

The above and other objects, features and advantages of my invention and the manner of attaining them will become more readily apparent, and the invention itself will best be understood, from the following description and appended claims, taken in conjunction with the accompanying drawings.

DETAILED DESCRIPTION

Figure 1:
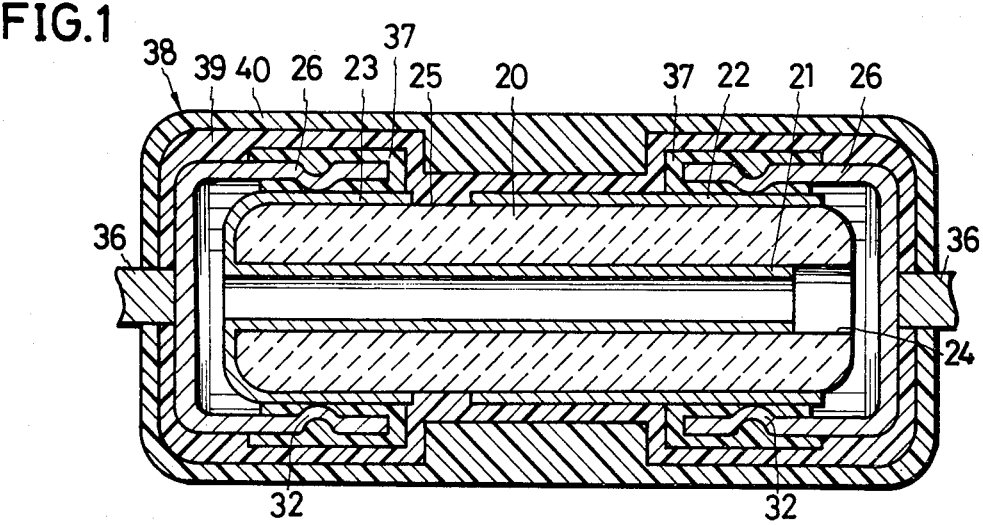
FIG. 1 is an axial sectional view of an example of tubular capacitor manufactured by the method of my invention.

In FIG. 1 of the accompanying drawings is shown, in its completed form, the tubular ceramic capacitor manufactured by the method of my invention. The manufacture of this capacitor starts with the production of a tube 20 of ceramic dielectric material shown also in FIG. 2. The ceramic dielectric material composed principally of strontium titanate, admixed with a binder, is extrusion molded into tubular form, and the product is cut into a desired length. This length of the extrusion product is fired, and then the edges of its opposite ends are rounded by grinding. Thus completed is the ceramic tube 20 to form the insulation between electrodes of the capacitor.

The next step is the formation of inner electrode 21 and outer electrode 22 on the ceramic tube 20. The inner electrode 21 has an extension 23 on the outer surface of the left hand end, as viewed in FIG. 2, of the ceramic tube 20. It should be noted that both inner 21 and outer 22 electrodes have portions overlying the outer surfaces of the opposite end portions of the ceramic tube 20. The inner electrode 21 terminates short of the right hand end of the ceramic tube 20 to provide an inner insulating band 24. An outer insulating band is formed at 25 between outer electrode 22 and inner electrode extension 23.

For the formation of the inner 21 and outer 22 electrodes, there is employed a conductive paint, or "silver paint," composed of powdered silver, glass frit, resin and solvent. The desired surface portions of the ceramic tube 20 are coated with the silver paint, as by use of a pin or coating the inner surface of the tube, and of a paint roller for coating its outer surface. The silver paint coatings are baked in a temperature range of 500°–800° C., to complete the inner 21 and outer 22 electrodes.

The preferred dimensions of the ceramic tube 20 and the electrodes 21 and 22 thereon will now be set forth by way of reference. The ceramic tube 20 has an axial length of 7.00 millimeters, an outside diameter of 1.78 millimeters, and an inside diameter of 1.00 millimeter. The inner 21 and outer 22 electrodes have each a thickness of 10 microns. The total outside diameter of the article of FIG. 2 (i.e., the ceramic tube 20 together with the electrodes 21 and 22 thereon) is therefore approximately 1.8 millimeters. The inner insulating band 24 has a width of 0.30 millimeter. The curvatures formed by grinding the edges at the opposite ends of the ceramic tube 20 have each a radius of 0.25 millimeter. These curved ends of the ceramic tube 20 are intended for smooth insertion into a pair of metal caps 26 to be described presently with reference to FIGS. 3 through 5.

The ceramic tube 20 together with the inner 21 and outer 22 electrodes thereon is then immersed in an approximately 10–40% by weight, preferably 20%, alcohol solution of rosin, with a chlorine content ranging from 0 up to 0.03% by weight. For drying the rosin coating thus formed thereon, the FIG. 2 article is then heated in a temperature range of 150°–170° C., preferably at 165° C., for one hour. A rosin film with a thickness of the order of angstrom is thus formed which completely covers the FIG. 2 article, overlying the inner 21 and outer 22 electrodes, the inner 24 and outer 25 insulating bands, and the exposed right hand end of the ceramic tube 20.

Figure 2:
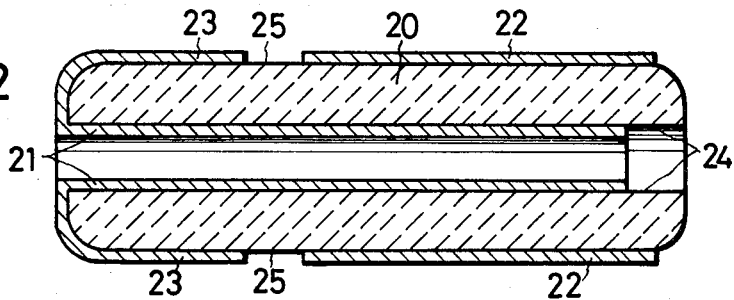
FIG. 2 is an axial sectional view of the ceramic tube and inner and outer electrodes thereon, the view being explanatory of a step in the manufacture of the capacitor of FIG. 1.
Figure 8:
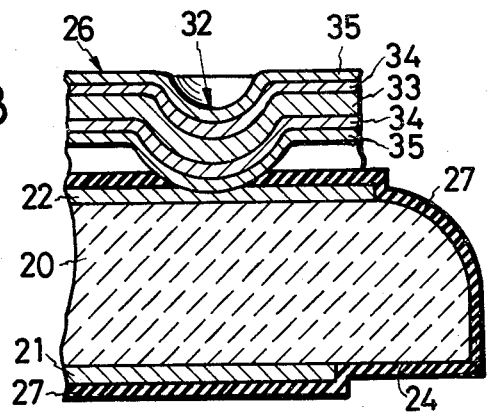
FIG. 8 is an enlarged, fragmentary axial sectional view of the FIG. 1 capacitor, the view being explanatory of the connection between each inward projection of each metal cap and one of the electrodes on the ceramic tube.

Being so thin, the rosin film is shown and designated 27 only in FIG. 8, which is the enlarged axial section of the FIG. 2 article and one of the metal caps 26 pressed in place thereon. This rosin film 27 is effective to facilitate the formation of firm soldered joints (to be described subsequently) between electrodes 21 and 22 and metal caps 26, to protect the electrodes against oxidation, and to provide protection against moisture intrusion. Having an electrical resistivity of $10^{15}$ ohm-centimeters, moreover, the rosin film 27 further serves to ensure positive insulation between the inner 21 and outer 22 electrodes at the inner 24 and outer 25 insulating bands.

Figure 3:
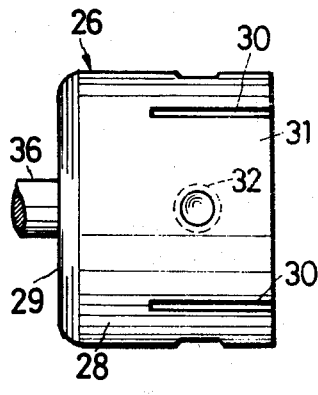
FIG. 3 is a side elevational view of one of the metal caps used in the manufacture of the FIG. 1 capacitor.
Figure 4:
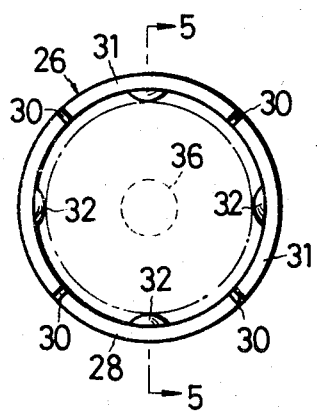
FIG. 4 is the right hand end elevational view of the metal cap of FIG. 3.
Figure 5:
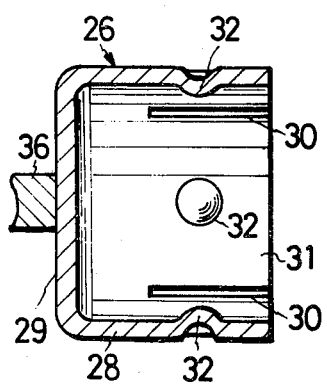
FIG. 5 is a sectional view of the metal cap taken along the line 5—5 in FIG. 4.

FIGS. 3 through 5 are illustrations of one of the pair of metal caps 26 to be pressed onto the opposite ends of the FIG. 2 article (inclusive of the rosin film 27) which has been prepared as above. Formed by the pressing of cold-rolled sheet steel, and with platings hereinafter set forth, each metal cap 26 comprises a hollow cylindrical portion 28 and an end cover 29 closing one end of the cylindrical portion. The cylindrical portion 28 of each metal cap 26 has a plurality of, four according to the illustrated example, slits 30 extending axially from its open end and terminating short of its closed end. These slits 30 divide the cylindrical cap portion 28 into four gripping fingers 31 which conform to the FIG. 2 article when the metal caps 26 are pressed in place thereon.

Each of the four gripping fingers 31 of each metal cap 26 has an inward projection 32 formed by indenting the cylindrical cap portion 28 from without, for engaging or being embedded in either of the electrodes 21 and 22. Each projection 32 may be either hemispherical or frustoconical in shape so that the metal caps 26 may be readily pressed in place. The outside diameter of the electrodes 21 and 22, indicated by the dot-and-dash line in FIG. 4, is slightly more than a notional circle tangent to the tips of the four inward projections 32 of each metal cap 26.

The preferred dimensions of each metal cap 26 are as follows. The metal cap 26 as a whole has a thickness of 0.15 millimeter. Its cylindrical portion 28 has an inside diameter of 1.85 millimeters and an outside diameter of 2.15 millimeters. The notional circle tangent to the tips of the four inward projections 32, arranged at approximately constant circumferential spacings on the cylindrical cap portion 28, has a diameter of 1.75 millimeters. Each inward projection 32 has therefore a height of 0.05 millimeter. The metal cap 26 has a depth (i.e., the axial length between its open end and the inside surface of its end cover 29) of 1.40 millimeters. Each having a width of 0.05 millimeter, the slits 30 extend from the open end of the cap toward its closed end approximately two thirds of the cap depth. The diameter of the notional circle tangent to the tips of the four inward projections 32 ranges from 93.8 to 99.8%, preferably from 93.8 to 99.5%, and most desirably from 97.1 to 97.6%, of the outside diameter of the electrodes 21 and 22.

Should the diameter of the above notional circle be greater than the above specified maximum value, the metal caps 26 would more or less loosely fit over the ends of the FIG. 2 article, making poor electrical and mechanical contact with the electrodes 21 and 22. The loss factor of the completed capacitor would also be high. Should the diameter of the notional circle be less than the above specified minimum value, on the other hand, then the ceramic tube 20 might suffer microfissures or other damage when the metal caps 26 are forced onto its opposite ends. Also the completed capacitor would not have the desired values of capacitance, loss factor, and insulation resistance. The height of each inward projection 32 of each metal cap 26 can range from 0.03 to 0.05%, preferably from 0.03 to 0.04%, of the outside diameter (1.80 millimeters in this case) of the electrodes 21 and 22.

Each metal cap 26 is required to undergo deformation, in the manner to be described subsequently, when pressed in place on the FIG. 2 article, increasing in the diameter of its cylindrical portion 28. In view of this the metal caps are annealed at a temperature of 600° C. for 30 minutes. By virtue of this annealing treatment and of the slits 30 formed therein, the cylindrical portion 28 of each metal cap 26 can be compressed into elliptic cross-sectional shape, by approximately 20% of its original shape, when pressed under a pressure of 1.3 kilograms. The metal caps of this deformation characteristic are quite suitable for being pressed onto the ends of the FIG. 2 article. Metal caps of a similar deformation characteristic can also be obtained by making them from brass and by annealing them at a temperature of 500° C. for 20 minutes.

As clearly depicted in FIG. 8, each metal cap 26 has formed on the steel substrate 33 a plated copper layer 34 and a plated solder layer 35. The copper layer 34 has a thickness of, for example, one micron and overlies both inner and outer surfaces of the steel substrate 33. Further overlying the copper layer 34, the solder layer 35 is composed of 8–12%, preferably 10%, by weight lead and 88–92%, preferably 90%, by weight tin. This solder layer 35 is intended to form soldered joints between metal cap projections 32 and electrodes 21 and 22, but not to form hermetic seals between metal caps 26 and electrodes 21 and 22. The thickness of the solder layer 35 can therefore be as small as 3–10 microns. Although in FIG. 8 the solder layer 35 is shown to be plated over the entire surfaces of the metal cap, the solder layer may be formed only over its inward projections 32, as by painting, as will be understood from the intended use of the solder layer noted above.

With reference back to FIGS. 3 through 5, each metal cap 26 has a wire lead 36 attached centrally to its end cover 29, as by electric welding, for electrical connection of the completed capacitor to external circuitry. The leads 36 may be welded onto the metal caps 26 after the caps have been pressed in place. For automating the manufacturing process, however, it is preferred to weld the leads to the metal caps immediately before they are pressed in place.

Figure 6:
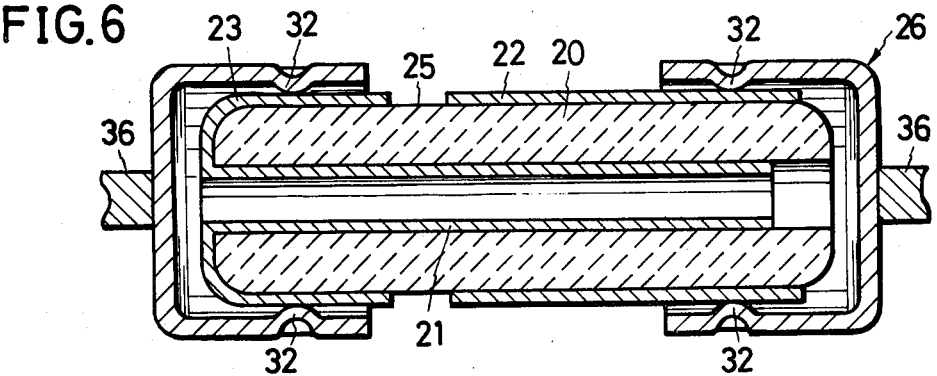
FIG. 6 is a view similar to FIG. 2 except that the pair of metal caps are shown mounted on the opposite ends of the ceramic tube.

Next comes the step of pressing the pair of metal caps 26 onto the opposite ends of the FIG. 2 article as shown in FIG. 6. While various methods may be employed to do this, the following method is believed to be the most convenient to expeditiously perform the step by automatic means. With the FIG. 2 article held against movement, the pair of metal caps 26 are simultaneously pressed into place thereon, by forcing the left hand cap rightwardly and the right hand cap leftwardly, as viewed in FIG. 6. The opposite end portions of the FIG. 2 article can be readily received in the cylindrical portions 28 of the metal caps 26 since the inside diameter of these cylindrical portions is considerably greater than the outside diameter of the FIG. 2 article.

The pressing of the pair of metal caps 26 onto the opposite ends of the FIG. 2 article results in the embedment of at least some of the left hand cap projections 32 in the inner electrode extension 23 and of at least some of the right hand cap projections 32 in the outer electrode 22, as best shown in FIG. 8. These metal cap projections 32 can be smoothly embedded in the electrodes 21 and 22 since the ceramic tube 20 has its ends rounded and since the projections 32 are each hemispherical or frustoconical in shape.

The cylindrical portions 28 of the metal caps 26 being pressed onto the FIG. 2 article initially undergo elastic deformation, due principally to the provision of the slits 30 therein. The deformation of the cylindrical cap portions 28 proceeds beyond their elastic limit. Ultimately, undergoing plastic deformation, the cylindrical cap portions 28 have their inward projections 32 embedded in the electrodes 21 and 22 and thus establish mechanical and electrical contact therewith.

In practice, however, some manufacturing errors must be tolerated in the outside diameter of the ceramic tubes. It is therefore likely that one or more of the four inward projections 32 of each metal cap 26 do not make proper engagement with the inner 21 or outer 22 electrode. For the elimination of this possible defect, the article of FIG. 6 (i.e., the FIG. 2 article plus the metal caps 26 mounted thereon) is then heated at a temperature of 350° C. for 30 seconds. The outermost solder layer 35 of each metal cap 26 is melted by this heat treatment, forming soldered joints between its inward projections 32 and the inner 21 or outer 22 electrode and thus establishing firm mechanical and electrical contact therebetween. Even in the case where all the projections 32 of the metal caps 26 have already been securely embedded in the electrodes 21 and 22, the soldered joints formed as above serve to reinforce the connection therebetween. The formation of these soldered joints is aided by the aforesaid rosin film 27 covering the FIG. 2 article.

The pair of wire leads 36 soldered onto the respective metal caps 26 are then straightened or aligned by means of a conventional strainer. The straining of the leads 36 at this stage is recommended because, in the succeeding steps of manufacture, sealing joints and insulating layers are to be formed on the FIG. 6 article while the latter is being revolved around the aligned leads. There is hardly any possibility of the metal caps 26 being detached from the FIG. 2 article by this lead straining operation because the caps have already been firmly pressed in place on the article and further soldered thereto.

An insulating paint is then prepared which is composed of epoxy resin of the bisphenol A type, filler, and hardener. While the FIG. 6 article is being revolved around the pair of leads 36 mounted on suitable bearing means and heated to a temperature range of 250°–350° C., the insulating paint is applied by a roller or rollers to the junctions between metal caps 26 and electrodes 21 and 22. The insulating paint can be coated to a constant thickness since the FIG. 6 article is being revolved as above about its own axis. The thus-applied paint is then hardened by being heated at a temperature of 150° C. for 20 minutes.

Figure 7:
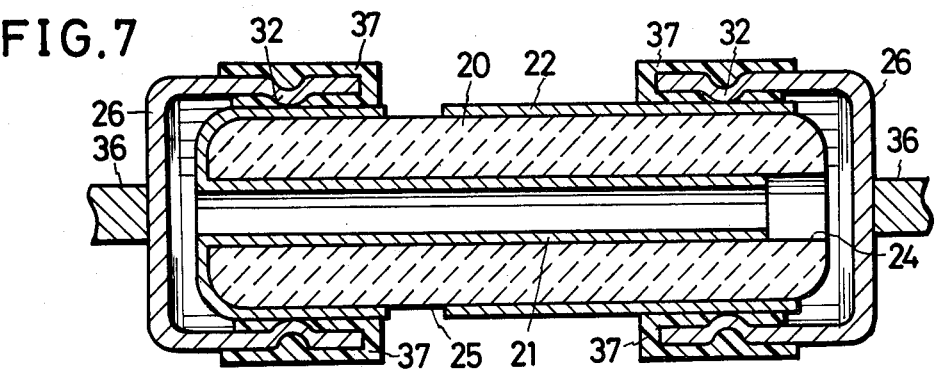
FIG. 7 is a view similar to FIG. 6 except that the sealing joints are shown formed betwen electrodes and metal caps.

In FIG. 7 are shown the joints 37 of the insulating paint thus formed between metal caps 26 and electrodes 21 and 22 for hermetically sealing the capacitor. The sealing joint portions overlying the metal caps 26 have each a thickness of approximately 70 microns. The slits 30 in the metal caps 26 are of course closed by the sealing joints 37. These slits are so narrow (0.05 millimeter) that they can be easily sealed by the insulating paint applied as above. Although the sealing joints may partly intrude into the interior of the metal caps 26, there is no fear of the electrodes 21 and 22 being short-circuited thereby since the joints are of electrically insulating material.

Should the sealing joints 37 be formed at room temperature, the air confined within the ceramic tube 20 and metal caps 26 would be expanded when heated in the hardening step of the sealing joints or in further subsequent steps of manufacture, to such an extent as to rupture the sealing joints. It is to obviate this that the FIG. 6 article is heated to the aforesaid temperature range of 250°–350° C., which is higher than the maximum temperature to be used in the subsequent steps of manufacture, to partly evacuate the interior of the article during the formation of the sealing joints 37 thereon. The same objective can of course be accomplished by forming the sealing joints on the FIG. 6 article in vacuum.

The sealing joints 37 are required to possess such properties as immunity to widely varying temperatures, adhesiveness, resistance to moisture, and electrical resistivity. These requirements can be met by compounding the insulating paint of, in addition to epoxy resin of the bisphenol A type, 31.5% by weight of a filler composed of talc [$Mg_3Si_4O_{10}(OH)_2$], calcium carbonate ($CaCO_3$) and silica ($SiO_2$), and a hardener composed of acid anhydride.

Having a viscosity of 48,000 centipoises, the insulating paint of this composition was found to provide sealing joints capable of withstanding the temperatures of −65°–130° C. and having a Shore hardness rating of 65. The water absorption rate of the sealing joints 37, after having been boiled for one hour, was less than 0.1%. The bondstrength provided by the sealing joints 37 between electrodes 21 and 22 and metal caps 26 was 100 kilograms per square centimeter. The electrical resistance of the sealing joints was $2.7 \times 10^{14}$ ohm-centimeters. The hermetic sealing ability of the joints 37 is also excellent, since no air bubbles were produced when the FIG. 7 article was immersed in a sealing test solution heated to a temperature of 125° C.

Generally, the sealing joints 37 should have a Shore hardness rating ranging from 50 to 80, most desirably 65, to withstand the temperatures of −65°–130° C. The sealing joints with this range of hardness can be obtained by admixing epoxy resin of the bisphenol A type with 25–35% by weight of the filler. Aside from the noted mixture of $Mg_3Si_4(OH)_2$, $CaCO_3$ and $SiO_2$, the filler can also be composed of any one or two selected ones of these compounds or can be of other commercially available compositions.

Although the seaing paint as prepared above is composed principally of epoxy resin of the bisphenol A type, the paint may also be formed by polybutadiene resin, polyurethane resin, silicone elastomer, or epoxy resin of other than the bisphenol A type, admixed with a desired filler. In some instances a filler may not be employed.

An external covering generally designated 38 in FIG. 1 is then formed over the FIG. 7 article for moistureproofing the ceramic tube 20, among other purposes.

The external covering 38 of the FIG. 1 capacitor is shown to comprise a first layer 39 of phenol resin and a second layer 40 of epoxy resin, with the latter overlying the former. The first layer 39 of the external covering 38 is formed by coating an alcohol solution of phenol resin over the entire surfaces of the FIG. 7 article and then by hardening the coating at a temperature of 150° C. The thickness of this first external covering layer 39 is preferably of the order of tenthmeters.

For the formation of the second layer 40 of the external covering 38, the above article is then heated to a temperature (approximately 200° C.) sufficiently high to melt powdered epoxy resin. The heated article is revolved around the pair of aligned leads 36 in contact with powdered epoxy resin. The molten epoxy resin coating on the first external covering layer 39 is baked at a temperature of 170° C. for 15 minutes thereby forming the second external covering layer 40. The total outside diameter of the thus-completed capacitor is 2.7 millimeters.

The first 39 and second 40 layers of the external covering 38 will not develop pinholes or the like during the above heat treatments thereof. This is because the interior of the capacitor has been more or less evacuated and hermetically sealed by the sealing joints 37. The remaining air within the capacitor cannot possibly be expanded to such an extent as to rupture the sealing joints 37.

It should be noted that the external covering 38 can be of minimum thickness since the covering is expected to make little contribution to the maintenance of the mechanical and electrical contact between electrodes 21 and 22 and metal caps 26. The desired contact between electrodes and metal caps can be maintained by the metal caps themselves which are positively pressed in place, with their inward projections 32 further soldered onto the electrodes, and by the sealing joints 37.

The completed tubular ceramic capacitor of FIG. 1 may then be colored as dictated by a prescribed color code. The capacitor is put to use with its pair of leads 36 connected to desired electrical circuitry.

The following advantages are gained by the method of manufacturing the tubular ceramic capacitor according to my invention:

1. The inner 21 and outer 22 electrodes are not to be short-circuited by the intrusion of the sealing joints 37 between electrodes and metal caps, because the insulating paint is employed to form the joints.

2. The sealing joints 37 are semiflexible, withstanding the temperatures of −65°-130° C.

3. The sealing joints 37 have sufficient adhesiveness and moistureproofing ability to protect the interior of the ceramic tube 20.

4. Since the interior of the ceramic tube 20 and metal caps 26 is more or less evacuated, thermally or otherwise, during the formation of the sealing joints 37, the sealing joints and the first 39 and second 40 layers of the external covering are not to be ruptured by the thermal expansion of the confined air.

5. The evacuation of the interior of the ceramic tube 20 and metal caps 26 is easy because the metal caps pressed in place are in contact with the electrodes 21 and 22 only at their inward projections 32, leaving sufficient gaps for the passage of air.

6. The wire leads 36 can be straightened immediately after the metal caps 26 are pressed in place, because their inward projections 32 are firmly engaged with the electrodes 21 and 22. It is therefore possible to form the sealing joints 37 and the second external covering layer 40 expeditiously and to constant thicknesses while the article of FIG. 6 or 7 is being revolved around the aligned leads 36.

7. Each metal cap 26 has the plated solder layer 35, which is melted to establish or reinforce the mechanical and electrical contact between electrodes 21 and 22 and metal cap projections 32.

8. The rosin film 27 covering the FIG. 2 article facilitates the formation fo the soldered joints between electrodes 21 and 22 and metal caps 26 and serves also to protect the electrodes against oxidation, to moistureproof the capacitor, and to ensure insulation of the electrodes from each other.

9. The metal caps 26 can be readily pressed in place because the ceramic tube 20 has its opposite end edges rounded.

10. The external covering 38 can be minimized in thickness because the metal caps 26 are firmly engaged with the electrodes 21 and 22 by the noted means other than the external covering and because the junctions between the electrodes and metal caps are hermetically sealed by the sealing joints 37.

SECOND EXAMPLE

Figure 9:
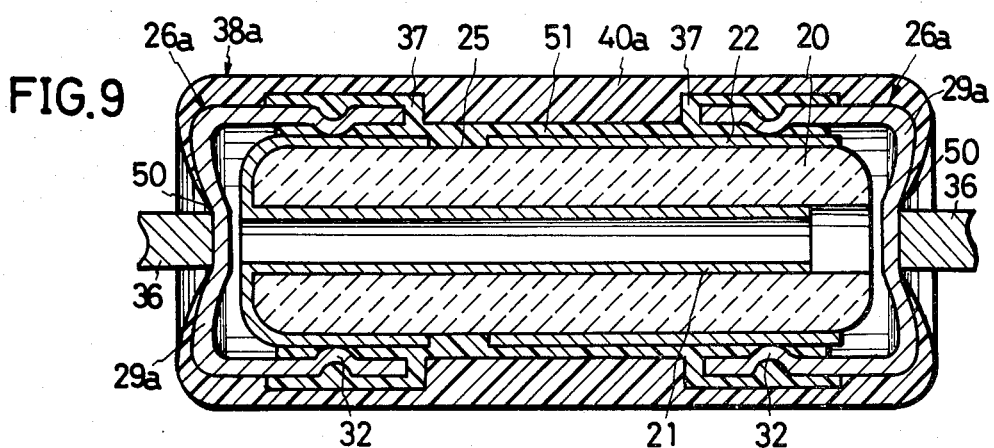
FIG. 9 is an axial sectional view of another example of tubular capacitor manufactured by the method of my invention.

In FIG. 9 is shown another example of tubular ceramic capacitor manufactured by the method of my invention. Most parts of this FIG. 9 capacitor will be readily identified since the same reference numerals are employed to denote the corresponding parts of the FIGS. 1 and 9 capacitors. The manufacture of the FIG. 9 capacitor also starts with the provision of the ceramic dielectric tube 20 and of the inner 21 and outer 22 electrodes thereon. The ceramic tube 20 together with the electrodes 21 and 22 thereon is then immersed in an alcohol solution of rosin to form the rosin film (not seen in FIG. 9) over the exposed surfaces thereof.

A pair of metal caps pressed onto the opposite ends of the ceramic tube 20 are designated 26a because they differ from the metal caps 26 of the FIG. 1 capacitor in that an indentation 50 is formed centrally in the end cover 29a of each metal cap 26a. Each wire lead 36 is soldered onto the end cover 29a of one of the metal caps 26a at its central indentation 50. The other details of construction of the metal caps 26a are identical with those of the metal caps 26. The method of pressing the metal caps 26a into place is also exactly as set forth above in connection with the first example of the inventive method.

The inward projections 32 of the metal caps 26a are then soldered onto the electrodes 21 and 22 by melting the plated solder layer (not seen in FIG. 9) covering each metal cap or at least its inward projections. The mechanical and electrical contact between electrodes 21 and 22 and metal caps 26a is thus established or reinforced.

While the interior of the ceramic tube 20 and of the metal caps 26a is partly evacuated as in the preceding example, the sealing joints 37 are formed between electrodes 21 and 22 and metal caps 26a by applying the noted insulating paint. In this second example, however, the sealing joints 37 are formed simultaneously with an integral bridge portion 51 lying between the pair of metal caps 26a and covering part of the outer electrode 22 and all of the outer insulating band 25. The sealing joints 37 complete with the bridge portion 51 are intended not only to hermetically seal the junctions between electrodes 21 and 22 and metal caps 26a but also to moistureproof the ceramic tube 20. The simultaneous formation of the sealing joints 37 and their integral bridge portion 51 is possible by use of a paint roller having a suitably stepped surface.

Since the sealing joints 37 with the integral bridge portion 51 serve the additional purpose of moistureproofing the ceramic tube 20, the external covering 38a of this FIG. 9 capacitor can be a single layer 40a of epoxy resin. This external covering can be formed just like the epoxy resin layer 40 of the external covering 38 of the FIG. 1 capacitor. During the formation of the epoxy resin layer 40a, the indented end covers 29a of the metal caps 26a serve to minimize the possibility of the molten epoxy resin flowing to the leads 36. The adhesion of the epoxy resin to the leads 36 is undesirable since the electrical connection of the capacitor to external circuitry might be impeded by the adhering resin.

Figure 10:
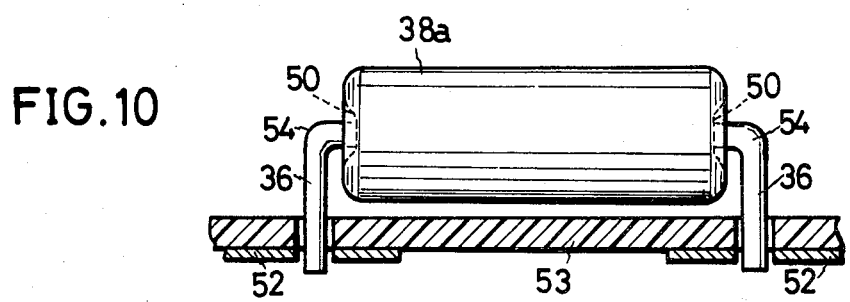
FIG. 10 is a side elevational view, partly in section, showing the FIG. 9 capacitor as mounted on a printed circuit board for use.

The indentation 50 in the metal cap end covers 29a serve the additional purpose of aiding in soldering the leads 36 to the exact centers of the end covers. Furthermore, in electrically connecting the capacitor to desired conductors 52 of external circuitry on a base 53 by bending the leads 36 as shown in FIG. 10, the bends 54 of the leads can be formed close to the ends of the capacitor. The distance between the bends 54 of the pair of leads 36 can therefore be minimized, resulting in the requirement of minimum stallation space for the capacitor.

In view of the above functions or advantages of the metal cap end cover identations 50, each indentation should have a depth of 0.1–0.4 millimeter, provided that each metal cap 26a has the same dimensions as set forth in conjunction with the metal caps 26 of the FIG. 1 capacitor. The diameter of each indentation 50 should be slightly more than that of each lead 36. Thus, if the lead diameter is 0.6 millimeter, for example, then the indentation diameter may be 0.8 millimeter. It will be seen that this second example of the inventive method also gains the ten advantages enumerated in connection with the first example.

THIRD EXAMPLE

Figure 11:
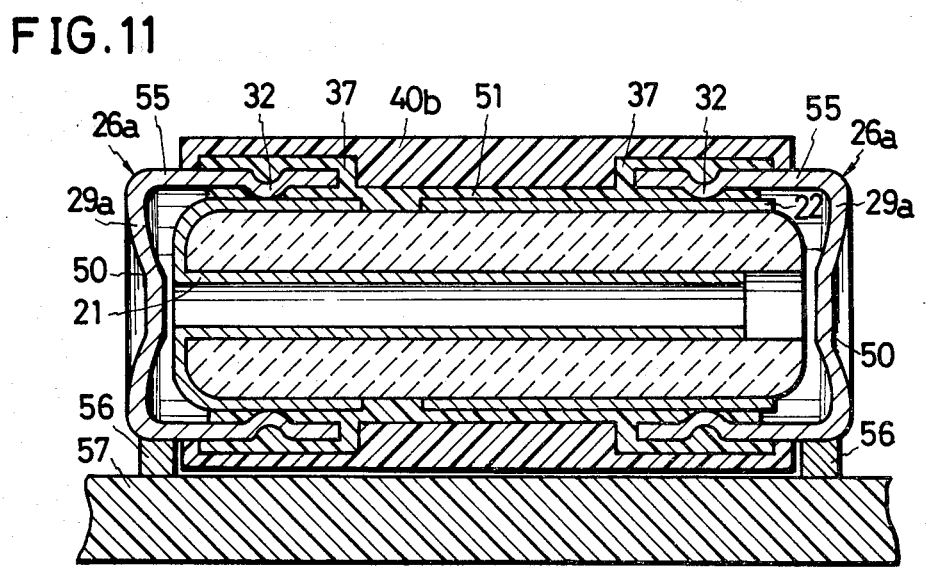
FIG. 11 is an axial sectional view of still another example of tubular capacitor manufactured by the method of my invention, the view also showing in section a printed circuit board on which the capacitor is mounted for use.

The method of my invention can further be employed for the manufacture of a tubular ceramic capacitor shown in FIG. 11. Most parts of this FIG. 11 capacitor are designated by the same reference characters as used to denote the corresponding parts of the FIG. 1 or 9 capacitor. The FIG. 11 capacitor is identical with that of FIG. 9 in that the pair of metal caps 26a have each the indentation 50 formed centrally in its end cover 29a, but differs therefrom in that the metal caps have no leads connected thereto.

The method of manufacturing the FIG. 11 capacitor, up to the step of soldering the metal cap projections 32 onto the electrodes 21 and 22, can be similar to the first or second example of the inventive method. The sealing joints 37 with the integral bridge portion 51 is then formed as in the second example of the inventive method. Although the FIG. 11 capacitor has no leads, the capacitor can be easily revolved around a pair of aligned pivot pins (not shown) which are held in abutting contact with the respective metal cap end cover indentations 50. As in the preceding examples, therefore, the sealing joints 37 with the integral bridge portion 51 can be formed by coating the noted insulating paint on the revolving capacitor with a paint roller.

By way of an external covering a single layer 40b of epoxy resin or the like is then formed over the sealing joints 37, their bridge portion 51, and parts of the metal caps 26a, leaving exposed parts 55 of the metal cap cylindrical portions 28. Instead of the leads 36 of the FIGS. 1 and 9 capacitors, these exposed parts 55 of the metal caps 26a serve to electrically connect the FIG. 11 capacitor to conductors 56 of external circuitry on a base 57.

Modifications

Figure 12:
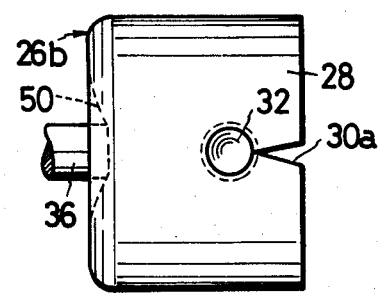
FIG. 12 is a side elevational view of a modified metal cap which can be employed for the manufacture of tubular capacitors by the method of my invention.
Figure 13:
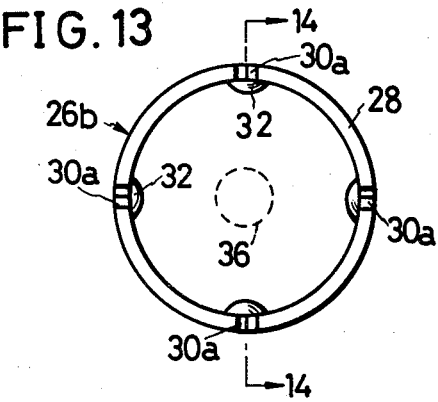
FIG. 13 is the right hand end elevational view of the modified metal cap of FIG. 12.
Figure 14:
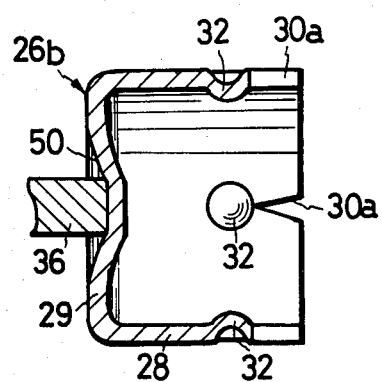
FIG. 14 is a sectional view of the modified metal cap taken along the line 14—14 in FIG. 13.

In FIGS. 12 through 14 is shown a modified metal cap 26b suitable for use with the method of my invention. The modified metal cap 26b has a plurality of, preferably four, notches 30a formed in the open end edge of its cylindrical portion 28. With the metal cap 26b assumed to have the same dimensions as the metal cap 26 of the FIG. 1 capacitor, each notch has a width, as measured at the open end of the cap, of 0.2 millimeters and a length, as measured in the axial direction of the cap, of 0.28 millimeter, which length is approximately one fifth the depth of the cylindrical cap portion 28.

Each inward projection 32 is formed adjacent to the apex of one of the notches 30a. The projections 32 have the same height as the projections on the metal caps 26 of the FIG. 1 capacitor. The end cover 29 of the metal cap 26b is shown to have the indentation 50 formed centrally therein, and the lead 36 is soldered onto the indented end cover 29.

The pair of metal caps 26b of the foregoing construction can be employed in lieu of the metal caps 26 of the FIG. 1 capacitor or of the metal caps 26a of the FIG. 9 capacitor. Also, be removing the leads 36, the metal caps 26b can be employed in lieu of the metal caps 26a of the FIG. 11 capacitor.

When pressed onto the opposite ends of the ceramic tube 20, the pair of metal caps 26b undergo elastic, and then plastic, deformation, just like the metal caps 26 and 26a, with the consequent embedment of the inward projections 32 in the inner 21 and outer 22 electrodes on the ceramic tube. The notched part of the cylindrical portion 28 of each metal cap 26b is of course deformed so as to increase in diameter, thereby helping the metal cap to be pressed in place.

Figure 15:
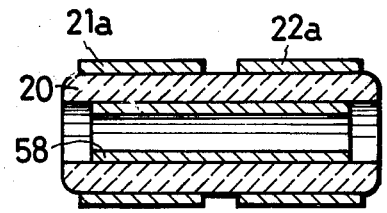
FIG. 15 is an axial sectional view showing the dielectric tube and electrodes of a further example of tubular capacitor which can be manufactured by the method of my invention.

FIG. 15 is a schematic representation of another example of tubular capacitor to which the method of my invention is applicable. The capacitor has first 21a and second 22a electrodes formed on the outer surfaces of the opposite end portions of the ceramic tube 20, and a third electrode 58 formed on the inner surface of the ceramic tube in opposed relationship to the first and second electrodes. In this type of capacitor the capacitance between first 21a and third 58 electrodes and the capacitance between second 22a and third 58 electrodes are interconnected serially. The pair of metal caps 26, 26a or 26b are to be mounted in mechanical and electrical contact with the first 21a and second 22a electrodes. The method of manufacturing this FIG. 15 capacitor will be apparent from the foregoing three examples of the inventive method.

Figure 16:
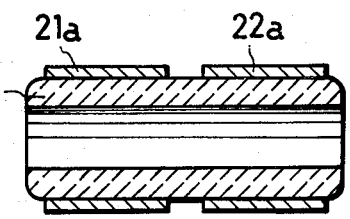
FIG. 16 is an axial sectional view showing the dielectric tube and electrodes of a still further example of tubular capacitor which can be manufactured by the method of my invention.

In an additional example of tubular capacitor shown in FIG. 16, to which the method of my invention is also applicable, the ceramic tube 20 has only the first 21a and second 22a electrodes formed on the outer surfaces of its opposite end portions. The capacitor of this type provides a capacitance of 0.1–5 picofarads. The pair of metal caps 26, 26a or 26b are to be mounted in mechanical and electrical contact with the first 21a and second 22a electrodes. The method of manufacturing the FIG. 16 capacitor will also be apparent from the foregoing three examples of the inventive method.

Although the method of my invention has been described in very specific aspects thereof with reference to the accompanying drawings, it is to be understood that the inventive method admits of many modifications or changes within the broad teaching hereof. For example, the ceramic tube may not necessarily be composed principally of strontium titanate, but of barium titanate or of titanium oxide. Further, each electrode on the ceramic tube may be of two layers consisting of, for example, nickel plating and solder plating, or of three layers consisting of, for example, baked silver coating, nickel plating and solder plating. Many other modifications or changes will readily occur to those skilled in the art without departing from the spirit or scope of my invention as expressed in the following claims.

I claim:

1. A method of manufacturing a tubular capacitor which comprises the steps of:
   (a) providing a tube of dielectric material having at least two electodes formed thereon, the electrodes overlying at least the outer surfaces of the opposite end portions of the dielectric tube;
   (b) forming a rosin film over the exposed surfaces of the dielectric tube and the electrodes thereon;
   (c) providing a pair of metal caps each having a plurality of inward projections formed at circumferential spacings thereon and a solder layer covering at least each inward projection;
   (d) pressing the metal caps onto the opposite ends of the dielectric tube, the inward projections of each metal cap being thus engaged with one of the electrodes on the dielectric tube;
   (e) melting the solder layer on each inward projection of each metal cap, thereby reinforcing mechanical and electrical contact between the electrodes and the metal caps through soldered joints thus formed between the electrodes and the inward projections of the metal caps;
   (f) forming substantially flexible, hermetic sealing joints at least between the electrodes and the metal caps by applying an electrically insulating paint while the interior of the dielectric tube and of the metal caps is substantially evacuated; and
   (g) forming an external covering of electrically insulating material at least over the sealing joints and a region therebetween.

2. The method of claim 1, wherein the rosin film is formed by immersing the dielectric tube and the electrodes thereon in a rosin solution and then by drying the rosin coating thus formed on the exposed surfaces of the dielectric tube and the electrodes.

3. The method of claim 2, wherein the rosin solution is a 10–40% by weight alcohol solution of rosin.

4. The method of claim 1, wherein the solder layer has a thickness of 3–10 microns.

5. The method of claims 1 or 4, wherein each metal cap comprises a steel base and a plated copper layer on the steel base, and wherein the solder layer is formed by plating on the plated copper layer.

6. The method of claim 5, wherein the solder layer comprises 8–12% by weight lead and 88–92% by weight tin.

7. The method of claim 1, wherein the sealing joints have a Shore hardness rating of 50–80.

8. The method of claim 7, wherein the insulating paint consists essentially of epoxy resin of the bisphenol A type.

9. The method of claim 8, wherein the insulating paint further comprises a 25–35% by weight filler.

10. The method of claim 9, wherein the insulating paint further comprises acid anhydride by way of a hardener.

11. The method of claims 1, 7, 8, 9 or 10, wherein the insulating paint is applied while the dielectric tube and the metal caps thereon are being heated to partly evacuate the interior thereof.

12. A method of manufacturing a tubular ceramic capacitor which comprises the steps of:
    (a) providing a tube of ceramic dielectric material having at least two electrodes formed thereon, the electrodes overlying at least the outer surfaces of the opposite end portions of the ceramic tube;
    (b) forming a rosin film over the entire exposed surfaces of the ceramic tube and the electrodes thereon by immersing same in a rosin solution and then by drying the rosin coating thereon;
    (c) providing a pair of metal caps each in the shape of a hollow cylinder closed at one end, each metal cap having a plurality of cuts formed in its open end and a plurality of inward projections formed at circumferential spacings on its cylindrical portion, each metal cap further having formed thereon a relatively thin solder layer covering at least each inward projection thereof;
    (d) pressing the metal caps onto the opposite ends of the ceramic tube, thereby embedding at least some of the inward projections of each metal cap in one of the electrodes on the ceramic tube;
    (e) melting the solder layer on each inward projection of each metal cap, thereby firmly reinforcing mechanical and electrical contact between the electrodes and the metal caps through the soldered joints thus formed between the electrodes and the inward projections of the metal caps;
    (f) foming semiflexible, hermetic sealing joints at least between the electrodes and the metal caps by applying an insulating paint while the interior of the ceramic tube and of the metal caps is partly evacuated by application of heat thereto; and
    (g) forming an external covering of insulating material at least over the sealing joints and a region therebetween.

13. The method of claims 1 or 12, wherein the external covering comprises a first layer consisting essentially of phenol resin, and a second layer consisting essentially of epoxy resin and overlying the first layer.

14. The method of claim 13, wherein the second layer is formed by adhering powdered epoxy resin to the first layer while the latter is being heated to a temperature at which the powdered epoxy resin is melted.

15. The method of claims 1 or 12, wherein the sealing joints are formed simultaneously with an integral bridge portion which lies between the pair of metal caps and which is also formed by the insulating paint, and wherein the external covering overlies the sealing joints, the bridge portion therebetween, and at least parts of the exposed surface portions of the metal caps.

16. The method of claim 15, wherein the external covering is formed by adhering powdered epoxy resin to the desired surfaces while the latter are being heated to a temperature at which the powdered epoxy resin is melted.

* * * * *